United States Patent [19] [11] 3,963,452
Jureit et al. [45] June 15, 1976

[54] CONNECTOR PLATE STOCK

[75] Inventors: John Calvin Jureit, Coral Gables; Gerald E. Robey, Miami, both of Fla.

[73] Assignee: Automated Building Components, Inc., Miami, Fla.

[22] Filed: Oct. 4, 1974

[21] Appl. No.: 512,314

[52] U.S. Cl. ............................ 29/193.5; 52/715; 85/13; 206/343
[51] Int. Cl.² ........................................ F16B 15/08
[58] Field of Search ........... 206/343, 821; 52/758 L, 52/759, 715; 85/13; 29/193, 193.5, 413

[56] References Cited
UNITED STATES PATENTS

| | | | |
|---|---|---|---|
| 3,011,226 | 12/1961 | Menge | 85/13 |
| 3,016,586 | 1/1962 | Atkins | 85/13 |
| 3,294,303 | 12/1966 | Anstett | 206/343 |
| 3,377,905 | 4/1968 | McAlpine | 85/13 |
| 3,416,283 | 12/1968 | Sanford | 85/13 X |
| 3,417,651 | 12/1968 | Moehlenpait | 85/13 |
| 3,494,645 | 2/1970 | Jureit | 85/13 X |
| 3,708,942 | 1/1973 | Leonard | 85/13 X |

FOREIGN PATENTS OR APPLICATIONS 1,090,373   11/1967   United Kingdom ................... 85/13

*Primary Examiner*—Arthur J. Steiner
*Attorney, Agent, or Firm*—LeBlanc & Shur

[57] ABSTRACT

The connector plate stock includes a sheet metal plate having a plurality of elongated nail-like teeth struck to project to one side thereof and in a plurality of longitudinally extending rows. Mutually normal scorelines are formed in the stock plate to define a plurality of discrete connector plates. The scorelines also define weakened portions along the stock plate between adjacent discrete connector plates whereby the latter are separable one from the other and from the stock plate. The connector plate stock per se provides a packing assemblage. The stock is stacked for shipping in pairs of stack plates having teeth extending toward one another. The stock plates of each adjacent pair thereof in the stock lie in back-to-back relation one with the other.

9 Claims, 16 Drawing Figures

CONNECTOR PLATE STOCK

The present invention relates to connector plates, for example those utilized in the wooden building construction industry, and particularly relates to connector plate stock and the connector plates formed therefrom.

Connector plates of the type having a plurality of elongated nail-like teeth struck therefrom are commonly utilized in the wooden building industry, for example to join the butting members of roof trusses or floor or ceiling joists. Wooden building frame fabricators utilize such individual plates by spotting the same on opposite sides of the joints of the frames as the frames are laid out in the required pattern on a jig table. Suitable and various types of presses are utilized to press the teeth of the connector plates into the joints of the frames.

Connector plates for use in the foregoing types of construction are normally supplied to the fabricators in the form of bar stock or precut individual plates. Bar stock comprises elongated strips of sheet metal having teeth prestruck therefrom. The strips are provided in lengths usually whole multiples of the lengths utilized by the fabricator whereby the fabricator cuts the bar stock into discrete connector plates of the desired size. In supplying the fabricator with connector plates precut to the appropriate size, or with the bar stock, the plates or bar stock have previously been either tumble packed or hand packed. In tumble packing, the plates or bar stock are randomly distributed in a box. It will be appreciated that this requires a large volume to transport a specified number of plates or stock. While the plates or stock can be hand packed and arranged in packing cases to conserve space, this has the distinct disadvantage in requiring a great deal of manual labor, particularly noting that the teeth struck from the plates render the same somewhat difficult to align with adjacent plates. Thus, tumble packing of discrete connector plates requires large space and volume for shipping purposes while hand packing requires the increased use and expense of manual labor. While bar stock can be more expeditiously and economically hand packed in comparison with the hand packing of individual connector plates, such savings are offset by the necessity for the fabricator to cut the bar stock to the required lengths.

The present invention provides connector plate stock from which discrete connector plates are formed for use in the wooden building construction industry in a form which minimizes or eliminates the foregoing noted and other various disadvantages associated with the provision of prior connector plate stock and/or the packaging of such stock or connector plates and provides novel and improved connector plate stock from which such discrete connector plates can be formed having various advantages in construction, and mode of use in comparison with prior connetor plate stock and/or the packaging thereof. Particularly, the present invention provides connector plate stock formed of a sheet metal plate having a plurality of teeth struck therefrom to form longitudinally extending rows of teeth projecting from one side of said plate. The stock is preferably scored in mutually perpendicular directions to define weakened plate portions along the scorelines and a plurality of discrete connector plates. Each discrete connector plate is therefore separable from the stock plate along the weakened portions of the stock plate, i.e., along the scoreline. The scorelines preferably comprise slits formed through the metal base of the stock plate at longitudinally spaced positions along the scoreline whereby the discrete connector plates can be detached manually from the stock plate and the other discrete connector plates defined therein.

The present invention also provides a packing assemblage of such connector plate stock wherein the sheet metal stock plate from which discrete connector plates are formed are bundled in spaced generally parallel planes with the bundles being thereafter stacked and banded together to form a packing assemblage. Particularly, the teeth of each adjacent pair of plates in each bundle project toward one another while adjacent plates of each adjacent pair of plates lie in back-to-back relation. Suitable bands or the like are provided about each bundle of plates to maintain this relationship. The bundles are thereafter stacked one on top of the other preferably in a criss-crossing pattern with the lowermost pair of bundles separated one from the other to admit the tines of a forklift truck whereby the packing assemblage is readily movable for shipping.

Accordingly, it is a primary object of the present invention to provide novel and improved sheet metal connector plate stock from which discrete connector plates are formed.

It is another object of the present invention to provide novel and improved sheet metal connector plate stock having a plurality of discrete connector plates delineated thereon and wherein such plates are readily separable therefrom and one from the other for individual use.

It is still another object of the present invention to provide novel and improved sheet metal connector plate stock having a plurality of discrete connector plates delineated thereon and wherein the delineations are provided by scorelines about which the discrete connector plates may be readily and manually separated one from the other and from the plate stock.

It is a further object of the present invention to provide a novel and improved sheet metal plate stock having mutually perpendicular scorelines extending therealong delineating discrete connector plates on the stock plate and which stock plate is readily and easily fabricated.

It is a related object of the present invention to provide a novel and improved packing assemblage for connector plate stock of the type having the foregoing characteristics.

These and further objects and advantages of the present invention will become more apparent upon reference to the following specification, appended claims and drawings wherein:

Figure 1:
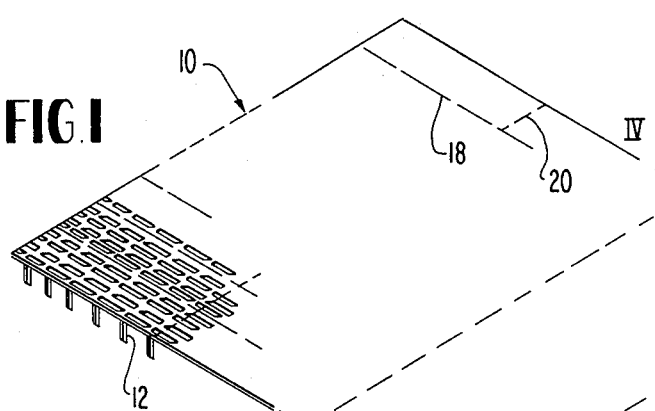
FIG. 1 is a perspective view of sheet metal connector plate stock constructed in accordance with the present invention.
Figure 2:
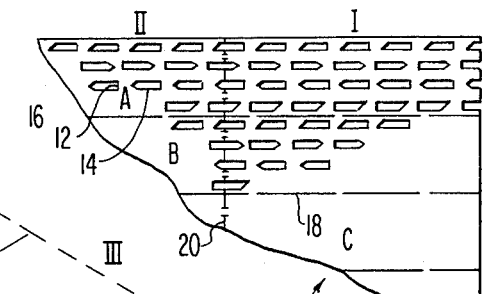
FIG. 2 is a fragmentary enlarged plan view thereof.

Referring now to the drawings, particularly to FIGS. 1 and 2, there is illustrated connector plate stock generally designated 10 comprised of a sheet metal plate having a plurality of elongated nail-like teeth 12 struck therefrom to project to one side of the plate. The teeth 12 are preferably elongated and generally nail-like in configuration. As illustrated in FIG. 2, teeth 12 are struck to lie in transversely spaced longitudinally extending rows. The teeth may be configured and arranged in the plate as desired consonant with the requirements of connector plates effective to join two or more butting wooden members one to the other. In the illustrated form and arrangement of the teeth, teeth 12 are struck such that the teeth leave slots 14 in the base 16 of the plate, the slots in each longitudinally extending row of teeth 12 extending in a like direction. The teeth of adjacent rows, however, are struck oppositely such that the slots 14 of adjacent longitudinally extending rows thereof extend from the associated teeth in opposite directions. The teeth illustrated herein are preferably configured and arranged in the plate as more particularly described in copending application Ser. No. 358,400 filed May 8, 1973, of common assignee herewith.

In accordance with the present invention, a plurality of mutually perpendicular scorelines are provided along the base of plate 10. Particularly, a plurality of longitudinally extending transversely spaced scorelines 18 are provided in the base 17 of plate 10 whereby plate 10 is delineated as containing a plurality of longitudinally extending strips designated A, B, C, etc. The scorelines 18, as particularly illustrated in FIG. 2, preferably lie medially between adjacent longitudinally extending rows of teeth 12 and more particularly between adjacent rows of slots 14 from which such teeth are struck. Similarly, a plurality of longitudinally spaced transversely extending scorelines 20 are provided in the base 17 of plate 10 whereby plate 10 is divided into a plurality of transversely extending strips designated by the Roman numerals I, II, III, etc. It will be appreciated that the scorelines 18 and 20 thus delineate a plurality of discrete connector plates formed in the plate 10. For example, scorelines 18 and 20 delineate the discrete connector plates designated in the grid formed thereby by the designations AI, AII, BI, etc.

The scorelines 18 and 20 are utilized to provide weakened portions in the base 17 of plate 10 by which the discrete connector plates delineated as described above in plate 10 may be separated one from the other and from plate 10 with a minimum force and preferably manually. Such scorelines preferably comprise a plurality of elongated slits closely spaced one to the other whereby only small metal portions remain between the slits for connecting the adjacent connector plates AI, AII, BI, etc. one to the other in the longitudinal and transverse directions. With this slit configuration of scorelines 18 and 20, the discrete connector plates are readily separated one from the other simply by breaking the desired one or more discrete connector plates from plate 10 about the scorelines delineating the particular discrete plate or plates desired. It will be appreciated that other types of scorelines may be utilized. For example, each scoreline may comprise a continuous groove formed along one or both sides of the metal whereby only a thin line of readily severable metal connects the discrete connector plates one to the other in both longitudinal and transverse directions. The scorelines may also comprise a series of perforations consisting of closely spaced openings formed in the plate. Combinations of such openings, slits, and grooves may be utilized as desired. As the term "scoreline" is herein utilized, it means any treatment of the base of the plate wherein the base is weakened along a predetermined path or paths and which path or paths delineate discrete connector plates separable from plate 10 and the other discrete connector plates with minimum force and preferably manually. It will also be appreciated that, while the longitudinally extending scorelines 18 are illustrated as defining discrete connector plates each having four longitudinally extending transversely spaced rows of teeth, the scorelines may be provided between any adjacent longitudinally extending rows of teeth depending upon the type and nature of the plate desired. For example, large connector plates having 8, 10 or 12 rows may be formed simply by scoring plate 10 along a path between the appropriate adjacent longitudinally extending rows of teeth. Also, the length of the plates can be varied by forming these transversely extending scorelines 20 at selected locations along plate 10.

Figure 3:
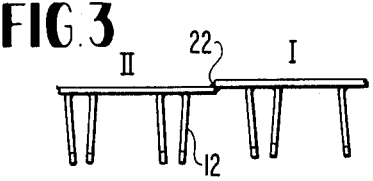
FIG. 3 is a fragmentary cross-sectional view thereof taken generally about on lines 3—3 of FIG. 1.
Figure 4:
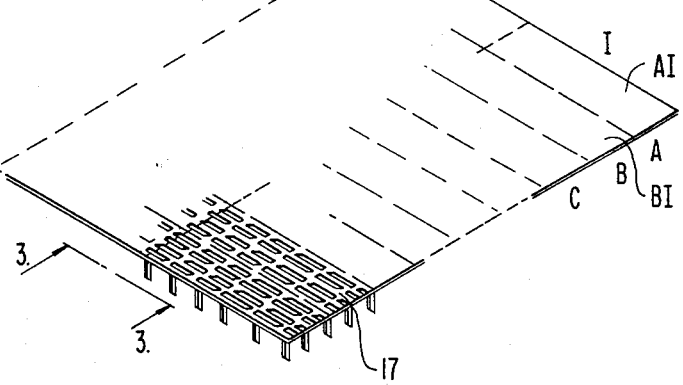
FIG. 4 is a view similar to FIG. 3 and illustrating a further form of stock hereof.
Figure 4:
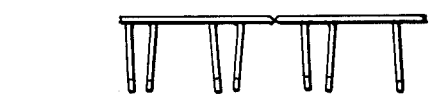

In FIG. 3, there is illustrated a step 22 between the transversely extending rows I and II separated by the scoreline 20. Step 22 is a result of passing the plate 10 longitudinally through the die to form the scorelines 22. Each transverse row of the plate may therefore lie in a plane spaced from the planes containing the other transverse rows I, II, etc. The plate 10, however, after the scorelines 20 are formed, may be straightened or flattened as indicated in FIG. 4 whereby the entire plate 10 lies in a common plane.

Figure 6:
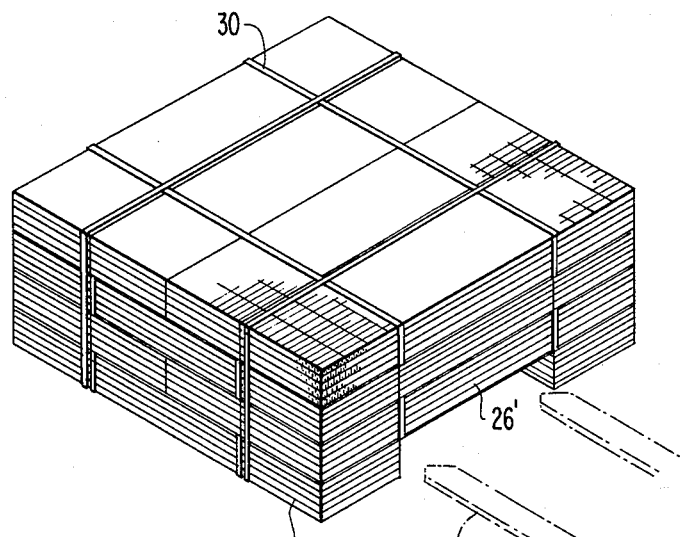
FIG. 6 is a perspective view of a packing assemblage comprised of a plurality of the bundles illustrated in FIG. 5.
Figure 5:
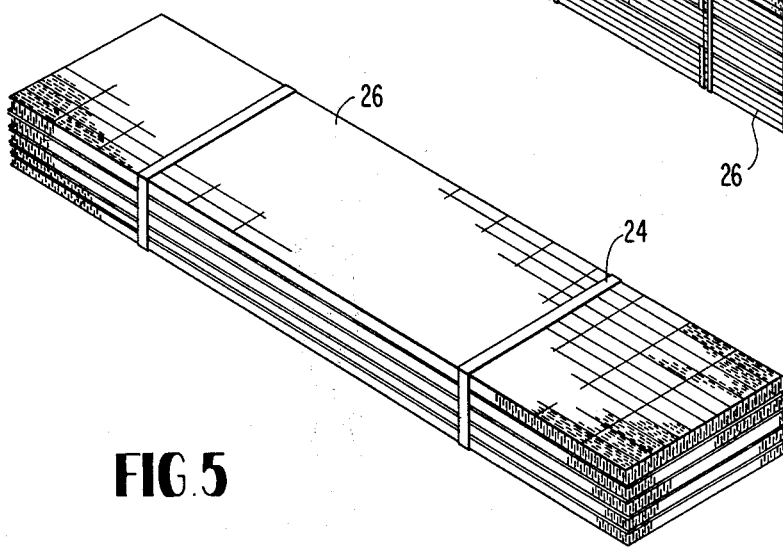
FIG. 5 is a perspective view of a bundle containing a plurality of the connector plate stock illustrated in FIG. 1.

Referring now to FIGS. 5 and 6, the manner of packaging the stock is illustrated. Particularly, in FIG. 5, the elongated plates 10 are banded together, for example by steel bands 24 to form a bundle of plates 10. In forming the bundle, plates 10 are preferably arranged in pairs of plates with each plate in each pair thereof having its teeth extending toward the other plate in such pair. Thus, adjacent plates 10 of each adjacent pair of plates in bundle 26 lie in back-to-back relation one to the other. It will be appreciated that the stacking of the plates in the foregoing manner can be accomplished expeditiously and with a minimum amount of labor. Also, by forming the bundle 26 in the manner described above and illustrated in FIG. 5, it will be appreciated that a very substantial number of discrete connector plates AI, AII, etc. can be packaged for shipment to a fabricator with only a very minimum number of plates 10 being handled.

In FIG. 6, handling of the plates 10 is further minimized by arranging the bundles in such a manner that a stack of bundles forms per se a packing assemblage which may be readily lifted by a forklift truck, the tines of which are indicated schematically at 28. For example, a pair of bundles 26 may be disposed on a support in parallel spaced relation one from the other a distance sufficient to permit the tines 28 of the forklift truck to enter between the bundles. The next layer of bundles 26' may be superposed on the lower bundles 26 but disposed in a direction at right angles to the lower bundles whereby bundles 26 bridge the space between the lower bundles 26. Additional layers of bundles may then be disposed to overlie bundles 26' and the entire stack of bundles 26 may then be banded together by bands 30. Consequently, not only does this type of packaging minimize the handling of the individual plates 10 but also permits shipping the plates without further packaging, for example as by locating plates 10 in cartons, etc.

Figure 7:
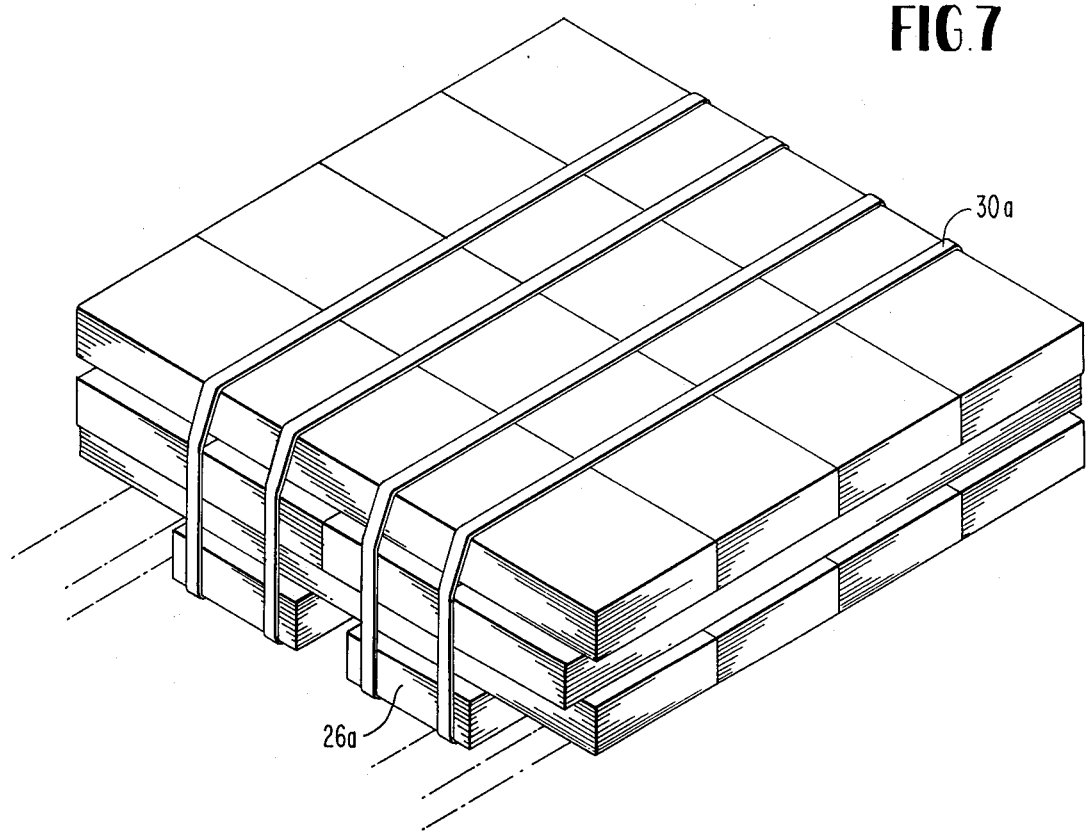
FIG. 7 is a perspective view of another form of packing assemblage containing a plurality of the bundled connector plate stock illustrated in FIG. 1.
Figure 8:
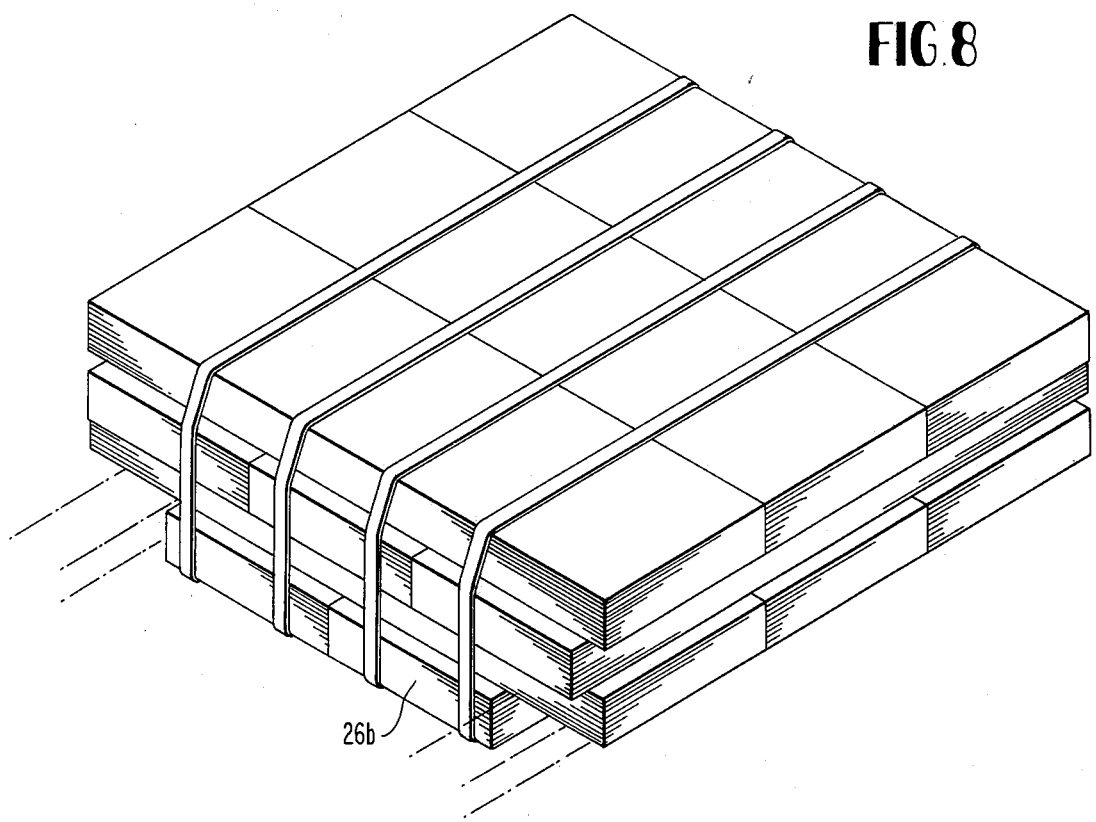
FIG. 8 is a perspective view similar to FIG. 7 illustrating a packing assemblage utilizing a different size of bundled connector plate stock.

Other forms of packing assemblages for the bundles of connector plate stock are illustrated in FIGS. 7 and 8. In FIG. 7, a lowermost pair of bundles 26a lie in parallel spaced side-by-side relation one to the other. The superposed bundles are then disposed in abutting side-by-side relation alternating in direction normal to the lowermost bundles 26a and parallel thereto for each successive tier of bundles. It has been found with this configuration of packing assemblage that a pair of straps 30a may be provided longitudinally about each of the lowermost bundles 26a thereby providing a total of four straps about the packing assemblage whereby the bundles in the packing assemblage are secured from movement relative to one another. While this unidirectional banding has been found to be satisfactory, it will be appreciated that banding can be applied to the assemblage in a direction normal to the banding illustrated in FIG. 7 and in conjunction with the banding illustrated.

For practical reasons, in order to transport all of the packing assemblages, it has been found that the packing assemblages should be maintained forty two inches or less in length. An example of the characteristics of the plate wherein such dimension is optimized may be comprised of plate stock formed of 20 gauge material weighing 1.5 pounds per square inch. Individual connector plates 6.8 inches in length and 25 inches wide may be formed in four rows of six plates each from this stock with the total length and width of each bar stock being 40.8 and 10 inches respectively.

Referring to FIG. 8, there is illustrated a similar packing assemblage but utilizing a different size plate. In this packing assemblage, a pair of bundles 26b are disposed in butting side-by-side relation to provide the foundation for the packing assemblage. Tiers of three bundles each are superposed on the base bundles 26b with the tiers extending in parallel and normal directions relative to the underlying bundles 26b for each successive tier of bundles. As in the embodiment illustrated in FIG. 7, a pair of straps may be applied about each of the underlying bundles 26a extending in the direction parallel thereto whereby a total of four straps are provided about the packing assemblage. Similarly, two-directional banding can be provided if desired. The stock bundles illustrated in FIG. 8 have a twelve inch width rather than a ten inch width as in the prior embodiment.

It will be appreciated that the assemblages of FIGS. 7 and 8 are readily lifted by a forklift. In FIG. 7, the lowermost bundles 26a are spaced apart such that the tines of a forklift, illustrated by the dashed lines, straddle the bundles with minimum clearance. In FIG. 8, the wider lowermost bundles butt one another and have a width such that the forklift tines straddle these bundles with minimum clearance when the bundles are butted. In both cases, the lowermost bundles are supported, when lifted by a forklift, by the uppermost bundles by the strapping. It has been found that little slippage occurs with this strapping arrangement.

Figure 9:
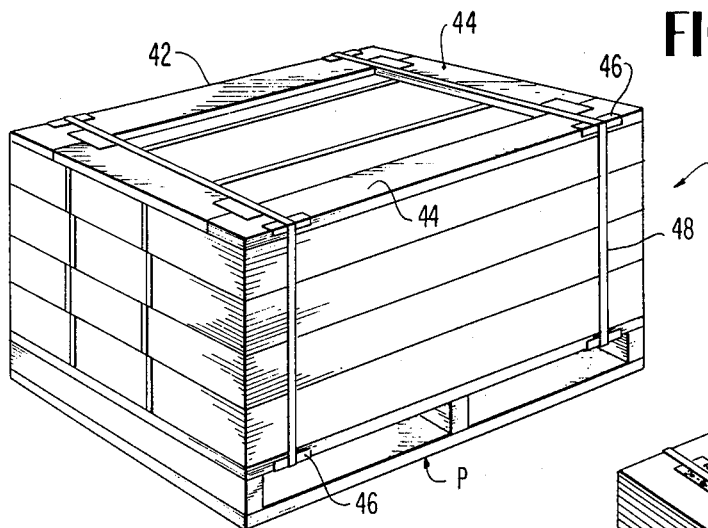
FIG. 9 is a perspective view illustrating a further form of packing assemblage for the bundled connector plate stock hereof.

Referring now to FIG. 9, there is illustrated a packing assemblage comprised of a plurality of bundles of connector plate stock superposed and laterally juxtaposed relative to one another to form a packing assemblage generally designated 40. The bundles are disposed on a pallet P and a compression frame 42 is disposed over the uppermost bundles. Particularly, the compression frame 42 comprises four wooden members 44 arranged to form a rectangular frame and joined one to the other at their corners by connector plates of the type disclosed herein. Banding aids 46 may be disposed about the edges of members 44 and also the edges of the deckboards of pallet P to prevent wear of the wood when the bands 48 are applied to secure the bundles as a packing assemblage. Particularly, the banding aids 46 are comprised of angle plates having teeth struck from one of the flanges of the plate whereby the angle plates can be secured with the teeth of the one flange embedded into the wooden members. The bands 48 thus overlie the banding aids as they wrap about the packing assemblage. It will be appreciated, of course, that the compression frame 42 and banding aids are not necessary in all applications and that the packing assemblage may be banded without the compression frame and banding aids. Also, it will be appreciated that the packing assemblage can additionally be banded horizontally with metal or heavy cardboard angles forming the uprights at the corners of the packing assemblage.

Figure 10:
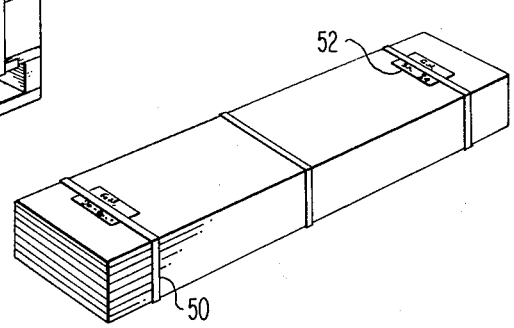
FIG. 10 is a perspective view of an individual bundle of connector plate stock and illustrated with a connector plate utilized to prevent shifting of bundles when in a packing assemblage.

Referring now to FIG. 10, there is illustrated a plurality of connector plate stock bundled similarly as described previously with bands 50 extending about the connector plate stock and securing the connector plate stock one to the other in face to face relation. In this form, however, a small connector plate of the type described herein is inserted between each band and the face of the bundle adjacent its opposite ends. The plate 52 is applied such that its teeth extend in a direction outwardly of the bundle. Consequently, when the bundle is stacked with other bundles superposed thereon irrespective of the direction in which such superposed bundles extend, the teeth engage in the slots of the connector plate stock of the superposed or underlying bundles and prevent lateral shifting of the bundles relative to one another.

Figure 11:
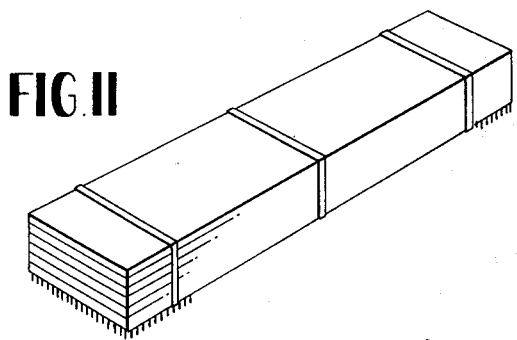
FIG. 11 is a perspective view of another form of bundle also utilized to prevent slippage adjacent bundles in a packing assemblage.

Referring to FIG. 11, there is illustrated a bundle similarly as previously described with the exception, however, that one of the connector plate stock is oriented such that its teeth project outwardly of the bundle. Consequently, when the bundle is superposed over or disposed below another bundle the teeth engage in the slots of the vertically adjacent bundle and prevent lateral shifting of the bundles relative to one another.

Both sides of the bundle could be provided with connector plate stock having teeth projecting outwardly of the bundle whereby such bundle could be alternated with bundles having smooth surfaces as previously described.

Figure 12B:
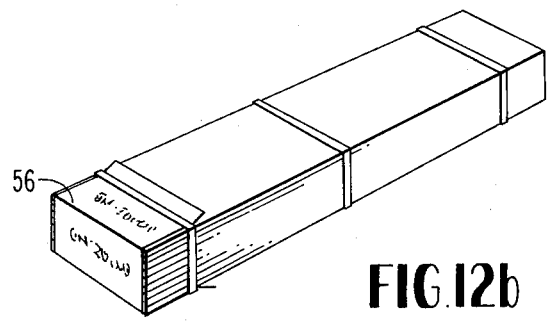
FIGS. 12A, 12B and 12C are perspective views of other forms of bundles of connector plate stock.
Figure 12A:
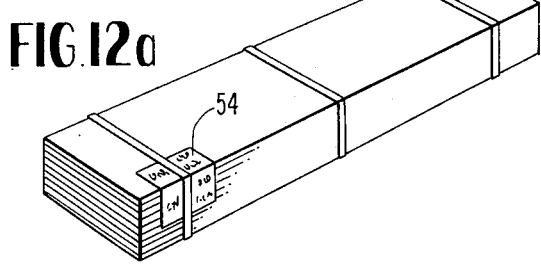
Figure 12C:
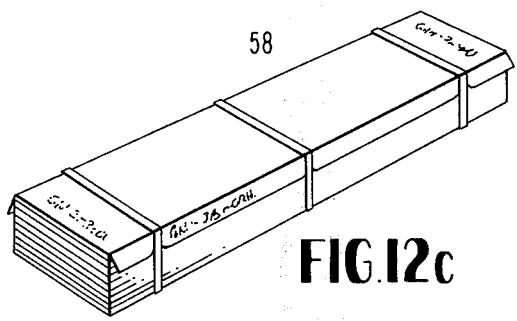

Referring now to FIGS. 12A–12C, there is illustrated bundles of connector plate stock having heavy duty paper, preferably corrugated paper, printed with identification of the size and gauge of the plate disposed between the banding straps and the connector plate stock of the bundle. In FIG. 12A, the paper 54 is formed about a corner of the bundle whereby the identification is readable from two sides of the bundle. In FIG. 12B, the paper 56 is disposd about one or both of the opposite ends of the bundle with the paper extending from one side of the bundle and across its end to the opposite side of the bundle. In FIG. 12C, the entire upper surface of the bundle is covered with paper 58 and the edges of the paper are overlapped along opposite sides of the bundle. In both FIGS. 12B and 12C, the banding retains the paper on the bundle and the identification printed on the paper is readable on three sides. The paper also serves to prevent or minimize slippage between adjacent bundles.

When the fabricator receives the packaged plates 10, the plates 10 are removed from the packing assemblage as needed. In forming the wooden building frames, for example trusses or joists or the like, the fabricator separates the discrete connector plates one from the other and from the plate 10 as the plates are needed. Particularly, the discrete plates are broken from the plate 10 along the scorelines simply by bending the plates thereabout. As noted previously, this is readily accomplished since the discrete connector plates can be separated manually and with minimum applied force. For example, applied forces on the order of 2 to 5 pounds are adequate to break out the connector plates from the plate stock.

Figure 13:
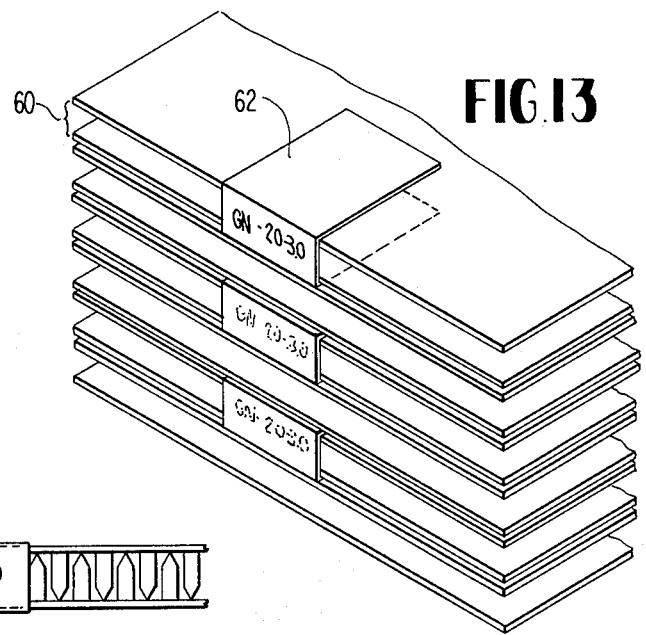
FIG. 13 is an enlarged perspective view illustrating another form of bundle.
Figure 13A:
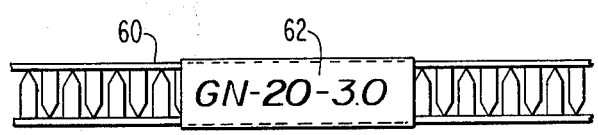
FIG. 13A is a fragmentary end view of the bundle of the packing assemblage shown in FIG. 13.

Referring now to the packing assemblage illustrated in FIG. 13, a plurality of superposed bundles 60 of connector plate stock are disclosed with each bundle comprising a pair of connector plate stock lengths with the teeth struck to extend in the direction of the opposed length of stock. Each bundle is provided at its end with a generally U-shaped identification label 62 which may be formed of corrugated paper for example Kraft paper. The exposed end of the label 62 may be provided with identifying indicia as indicated in FIG. 13A to identify the type of connector plate stock in the bundle. This packing assemblage may be bundled as the others previously described.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by U.S. Letters Patent is:

1. Connector stock plate comprising a sheet metal plate having a plurality of teeth formed therefrom to project to one side of said plate and leaving a plurality of elongated openings in said plate, said teeth being provided in a plurality of transversely spaced, longitudinally extending rows of slots, with said teeth and said slots being distributed over substantially the entire surface of said plate, said stock plate having a plurality of transversely spaced score lines extending in longitudinal, generally parallel directions, parallel to and between selected adjacent longitudinally extending rows of teeth and between slots left in the plate by said teeth, said stock plate also having a plurality of longitudinally spaced score lines extending in transverse generally parallel directions, and in a direction generally normal to the slots left in the plate by said teeth and intersecting at least some of said slots, whereby at least four discreet connector plates are defined in said stock plate, said score lines each defining weakened portions along the stock plate whereby the said discreet connector plates are separable one from the other and from the stock plate.

2. Connector stock plate according to claim 1 wherein said score lines comprise a plurality of slits formed in said stock plate and extending thereinto from opposite sides thereof.

3. Connector stock plate according to claim 2 wherein said score lines are formed by an initial upsetting of said stock plate along said score line so that adjacent portions of said stock plate lie in different planes followed by a resetting of said stock plate so that adjacent portions thereof lie in the same plane separated by slits extending into opposite surfaces thereof.

4. Connector stock plate according to claim 1 wherein the scorelines extending in one of said normal directions comprises two or more spaced scorelines whereby at least six discrete connector plates are defined in said stock plate.

5. Connector stock plate according to claim 1 wherein a plurality of scorelines extend in each of the generally mutually normal directions whereby at least nine discrete connector plates are defined in said stock plate.

6. Connector stock plate according to claim 5 wherein said plurality of scorelines generally parallel to said longitudinally extending rows of teeth lie between adjacent longitudinally extending rows of teeth respectively.

7. Connector stock plate according to claim 6 wherein said teeth are elongated and nail-like in configuration.

8. Connector stock plate according to claim 7 wherein said scoreline comprises a plurality of spaced elongated slits formed in said stock plate.

9. Connector stock plate according to claim 1 wherein said scorelines comprise a plurality of spaced elongated slits formed in said stock plate.

* * * * *